(12) United States Patent
Cheatle

(10) Patent No.: US 7,346,212 B2
(45) Date of Patent: Mar. 18, 2008

(54) AUTOMATIC FRAME SELECTION AND LAYOUT OF ONE OR MORE IMAGES AND GENERATION OF IMAGES BOUNDED BY A FRAME

(75) Inventor: Stephen Philip Cheatle, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1155 days.

(21) Appl. No.: 10/381,748

(22) PCT Filed: Feb. 22, 2002

(86) PCT No.: PCT/GB02/00792

§ 371 (c)(1),
(2), (4) Date: Mar. 28, 2003

(87) PCT Pub. No.: WO03/012678

PCT Pub. Date: Feb. 13, 2003

(65) Prior Publication Data

US 2004/0080670 A1    Apr. 29, 2004

(30) Foreign Application Priority Data

Jul. 31, 2001    (GB) ................................. 0118604.8

(51) Int. Cl.
*G06K 9/20*    (2006.01)
(52) U.S. Cl. ...................... 382/173; 382/282
(58) Field of Classification Search ...................... None
See application file for complete search history.

(56) References Cited

U.S. PATENT DOCUMENTS

| 3,956,758 | A | | 5/1976 | Numata et al. |
| 4,317,620 | A | | 3/1982 | Coppa et al. |
| 4,384,336 | A | | 5/1983 | Frankle et al. |
| 4,423,936 | A | | 1/1984 | Johnson |
| 4,497,065 | A | * | 1/1985 | Tisdale et al. ............... 382/103 |
| 4,541,704 | A | | 9/1985 | Freeman |
| 4,605,970 | A | | 8/1986 | Hawkins |
| 4,724,330 | A | | 2/1988 | Tuhro |
| 5,091,654 | A | | 2/1992 | Coy et al. |
| 5,227,889 | A | | 7/1993 | Yoneyama et al. |

(Continued)

FOREIGN PATENT DOCUMENTS

DE    2 350 251    11/2000

(Continued)

OTHER PUBLICATIONS

Teruo, "Foreground Picture Extracting Method, Picture Processor, Automatic Trimming Device, Recording Medium and Portrait Picture Device," *Patent Abstracts of Japan*, vol. 2000, No. 05, Sep. 14, 2000, JP 2000-036032, Feb. 2, 2000, Abstract.

(Continued)

*Primary Examiner*—Brian Werner
*Assistant Examiner*—Mia M Thomas

(57) ABSTRACT

A method is disclosed of analyzing an image to identify "must exclude" regions and of determining the best fit of an image outline so as to generate an image boundary that excludes the majority of "must exclude" regions. The method is applicable to the automatic generation of greeting cards and photo-montages.

26 Claims, 7 Drawing Sheets

U.S. PATENT DOCUMENTS

| | | | |
|---|---|---|---|
| 5,345,284 | A | 9/1994 | Tsuruta |
| 5,384,615 | A | 1/1995 | Hsieh et al. |
| 5,486,893 | A | 1/1996 | Takagi |
| 5,500,711 | A | 3/1996 | Sasagaki et al. |
| 5,511,148 | A | 4/1996 | Wellner |
| 5,517,242 | A | 5/1996 | Yamada et al. |
| 5,666,186 | A | 9/1997 | Meyerhoefer et al. |
| 5,838,836 | A | 11/1998 | Omvik |
| 5,900,909 | A | 5/1999 | Parulski et al. |
| 5,901,253 | A | 5/1999 | Tretter |
| 5,973,734 | A | 10/1999 | Anderson |
| 5,978,519 | A | 11/1999 | Bollman et al. |
| 6,067,112 | A | 5/2000 | Wellner et al. |
| 6,289,110 | B1 | 9/2001 | Kim et al. |
| 6,358,341 | B1 * | 3/2002 | Bergquist ............... 156/63 |
| 6,389,181 | B2 * | 5/2002 | Shaffer et al. ............ 382/305 |
| 6,430,320 | B1 | 8/2002 | Jia et al. |
| 6,434,579 | B1 * | 8/2002 | Shaffer et al. ............ 715/520 |
| 6,556,721 | B1 | 4/2003 | Wang et al. |
| 6,587,596 | B1 * | 7/2003 | Haeberli ............... 382/283 |
| 6,625,309 | B1 * | 9/2003 | Li et al. ............... 382/173 |
| 6,636,648 | B2 * | 10/2003 | Loui et al. ............. 382/284 |
| 6,671,405 | B1 | 12/2003 | Savakis et al. |
| 6,686,970 | B1 | 2/2004 | Windle |
| 6,704,440 | B1 * | 3/2004 | Kump ................. 382/132 |
| 6,728,407 | B1 | 4/2004 | Horiuchi et al. |
| 6,771,801 | B1 * | 8/2004 | Fisher et al. ............ 382/112 |
| 6,813,395 | B1 | 11/2004 | Kinjo |
| 6,907,136 | B1 * | 6/2005 | Shigemori ............. 382/118 |
| 6,934,052 | B2 | 8/2005 | Venable |
| 6,964,025 | B2 * | 11/2005 | Angiulo et al. .......... 715/838 |
| 6,973,222 | B2 * | 12/2005 | Haeberli ............... 382/283 |
| 7,133,571 | B2 * | 11/2006 | Cheatle ............... 382/282 |
| 2001/0014183 | A1 | 8/2001 | Sansom-Wai et al. |
| 2002/0028071 | A1 | 3/2002 | Molgaard |
| 2002/0114535 | A1 | 8/2002 | Luo |
| 2002/0152291 | A1 | 10/2002 | Fernandez et al. |
| 2002/0191860 | A1 | 12/2002 | Cheatle |
| 2003/0152291 | A1 | 8/2003 | Cheatle |
| 2004/0052430 | A1 | 3/2004 | Albertelli et al. |
| 2006/0203107 | A1 | 9/2006 | Steinberg et al. |
| 2006/0204057 | A1 | 9/2006 | Steinberg |

FOREIGN PATENT DOCUMENTS

| | | |
|---|---|---|
| EP | 0 949 802 A2 | 10/1991 |
| EP | 0 456 414 A2 | 11/1991 |
| EP | 0 595 299 A2 | 5/1994 |
| EP | 0 824 246 A2 | 2/1998 |
| EP | 0824246 | 2/1998 |
| EP | 0 912 047 A2 | 4/1999 |
| EP | 0 924 923 A2 | 6/1999 |
| EP | 1 158 464 A1 | 11/2001 |
| GB | 2 124 055 A | 2/1984 |
| GB | 2 350 254 A | 11/2000 |
| JP | 6-059430 | 3/1994 |
| JP | 2000-244800 | 9/2000 |
| JP | 2001-148843 | 5/2001 |
| WO | WO 95/32581 A1 | 11/1995 |
| WO | WO 99/03264 A1 | 1/1999 |
| WO | WO 99/09887 A1 | 3/1999 |
| WO | WO 00/38417 A1 | 6/2000 |
| WO | 03/012678 | 2/2003 |

OTHER PUBLICATIONS

K. Hachimura et al., "Image Retrieval Based on Compositional Features and Interactive Query Specification", *IEEE*, Sep. 3, 2000, pp. 262-266.

C. Ordonez et al., "Discovering Association Rules Based on Image Content", *IEEE*, May 19, 1999, pp. 38-49.

* cited by examiner

AUTOMATIC FRAME SELECTION AND LAYOUT OF ONE OR MORE IMAGES AND GENERATION OF IMAGES BOUNDED BY A FRAME

FIELD OF THE INVENTION

The present invention relates to a method of defining an image boundary which acts to frame an image or which serves to define an area of an image which is to be displayed, a computer program product which, when run on a data processor, causes the data processor to execute the method of defining an image boundary, and an image processing system for defining an image boundary and for presenting one or more bounded images for display.

BACKGROUND OF THE INVENTION

There already exists software and image processing systems that allow a user to position a captured image within an image boundary, thereby cropping (i.e. excluding portions) the image to generate greeting cards or photo-montage layouts, or other similar products. The shape of the image boundary is selected by the user. The selection of the shape of the image boundary is, in some circumstances, particularly burdensome to the user. For example, when wishing to generate a greetings card a user must select one of a number of different generic image boundary shapes. The appropriate selection of the shape of the image boundary for any particular image to generate a pleasing end result may either be time consuming, or beyond the artistic capabilities of the user. Additionally or alternatively, the user may simply wish to generate the greetings card in as a short time as possible.

SUMMARY OF THE INVENTION

It is also known to provide photo-montages. A photo-montage is a number of individual images individually arranged within an overall boundary (which defines the extent of a display region) and/or arranged to overlap one another. The time taken to manually select appropriate images and to either physically or electronically "cut and paste" and scale the selected images to produce the final montage can be prohibitive to many users, even though it has been found that the resulting photo-montage is a particularly pleasing way of presenting a number of images.

It would therefore be advantageous to provide a method of and apparatus for automating the selection of images to create greeting cards, photo-montages, or the like and to automatically define appropriate image boundaries for such greeting cards or photo-montages.

The main requirement in such a method and system is to define an appropriate image boundary, either with reference to a number of predefined image outlines, or simply in relation to the image itself.

According to a first aspect of the present invention there is provided a method of arranging at least one image within a display area, the method comprising the steps of: analysing the or each image in accordance with at least one predefined composition rule; for the or each image selecting an image boundary the shape of which, in accordance with said analysis, best fits said image; applying the boundary to the at least one image to produce a processed image; and placing the at least one processed image within said display area.

Preferably the analysing step comprises identifying one or more features of compositional significance and/or identifying a number of regions of interest within the image. A region of interest generally denotes some feature within the image. A region of compositional significance can be a region of interest or a region which is not interesting, for example, background. A single region or a combination of regions of interest is then selected and the at least one composition rule is applied to the features of compositional significance that are located within and adjacent a selected combination of regions of interest. This allows an image or a sub-portion of the image to be analysed to identify regions to be included and regions that are to be excluded The portion of the image can be regarded as a composition map as it identifies the included and excluded features of the image.

Preferably the shape of image boundary that optimally includes the "include" regions and optimally excludes the "exclude" regions for each combination of regions in the composition map is defined as the best fit.

Preferably, one or more parameters of the shape of the image boundary may be adjusted to optimise this best fit. Preferably the image boundary shape is selected from a plurality of geometric shapes.

Preferably, once the processed image has been generated, it is positioned in the display area in accordance with at least one predetermined placement rule.

The display area may comprise a predefined arrangement of image boundaries. Alternatively, a user may define one or more of the number, position and size of the image boundaries. The user may also control one or more parameters of the display area so as to control the overall style of the display area, for example, specifying a single generic shape (rectangle, ellipse, etc.) to be used for all image boundaries in the display area.

Images, (especially but not exclusively for greeting cards), may have a border added whose colour and style is chosen automatically. The colour of the border may be selected on the basis of the dominant colours in the image. Thus, for example, the border colour chosen could be automatically selected to match a strongly salient colour in the image—such as a red dress worn by a subject of the image.

Alternatively, the border colour could be selected so as to match the largest area colour of the image.

Alternatively, the border colour could be chosen to deliberately contrast with one of the largest areas of colour of the image. Such as choosing a dark frame for a light image.

Alternatively a look up table or some other colour mapping method could provide a harmonising colour for the dominant colour in the image.

Many other automatic methods of selecting the border colour by analysing the significant colours in the image could be implemented if desired.

The style (pattern) of the border could also be selected automatically. Thus, for example, the style could be a random choice from a set of alternatives, a choice based on the users previously recorded preferences, or selected on the basis of the overall texture of the image. Various measures of texture would be applicable. For example, whether the image contains a predominance of straight lines, if so, use a border style which is relatively plain and straight. If not, then use a slightly patterned border style.

Preferably the number of image boundaries placed within the display area is equal to the number of original images. However, the number of images and image boundaries need not be matched. Thus, for example, if there are more images than holes available in a montage template, then some images cannot be used and must be discarded. One basis for doing this might be to rank images by size of the regions of interest therein and to exclude those images with only small regions of interest. In the case where there are more holes to fill in the montage template then each image is used once. Then a search for alternative crops from the images may be performed. For example, regions of interest may be re-analysed to define sub-regions to be displayed. Thus, if a group of people represented one region of interest, then a sub-region may be a close up of a face of one of the people.

It is thus possible to provide a method of arranging N images within a display area, where N is a positive integer greater than zero, the method comprising the steps of:
i. Selecting an Ith image, where I is a positive integer in the range 1 to N, inclusive;
ii. Analysing the Ith image in accordance with at least one rule of image composition to define at least one include region and at least zero exclude regions;
iii. Repeating the steps i and ii for all images;
iv. Selecting for the Ith image an image boundary which, when applied to the Ith image, includes at least one of the include regions within the boundary and excludes any exclude regions; but which also takes account of other ones of the images so as to optimise the arrangement of images and image boundaries;
v. Applying the image boundary to the Ith image to generate an Ith processed image; and
vi. Positioning the Ith image within the display area in accordance with at least one positioning rule.

Such a method is of use when generating a montage where the images are placed in a defined template.

The analysis may also identify "don't care" regions where those regions or portions of those regions may be included within the image boundary so as to aid placement of the include region within the boundary.

There are constraints and problems which are faced in the generation of montages. In the case where the arrangement of holes is predefined by the montage template, the optimisation problem is that of allocating images to holes. The aspect ratio and size of the holes are fixed by the template. It is then a matter of heuristic optimisation to decide which image should be used to fill which hole. Thus, wide thin holes may be good for landscapes, whereas small square holes may be better for faces. The invention compares images with the holes available and generates the best crop for each possible hole/image combination and then selects the best overall set such that all the holes are filled with reasonably good crops. Thus the optimisation is global across all images.

However, it is also possible that the template merely acts as a guide and that the individual holes within the template may be adjustable in terms of size and aspect ratio.

Consider for example a template made up of rectangular holes. It may be possible to allow the hole sizes to be adjusted. However, in order to maintain the overall appearance of the template it may also be necessary to place constraints on the size of the boundary between the holes. This may entail defining maximum and minimum distances between the holes (or even defining a fixed distance). Thus changes in the size of any hole may affect the size of one or more of the other holes in the montage.

Thus the fitting problem may be global, in that all fits need to be optimised together.

In the case of a non-overlapping montage where the system has some latitude in generating the arrangement of holes, that is the generic shape used, the number of shapes, choice of size and aspect ratio, then the optimisation problem has more degrees of freedom. The problem is then not quite as simple as cropping each image independently and then rearranging the resulting crops in the display area. However, this approach could be used. A better approach is to use a global constraint to ensure that there is an appropriate range of shapes to ensure that the montage has an interesting variety of shapes, and also to ensure that the shapes fit together in a pleasing manner. One way of achieving this is to pick a subset of key images, typically less than five, and generate the best independent crops for these and then place them in the display area such that they are large and fairly well distributed. A set of smaller crop boundaries may then be generated to fill the remaining space in the display area. The allocation of the remaining images to the holes is then optimised in a way similar to that for the predetermined template.

In one embodiment of the invention, relating to the generation of overlapping montages, a plurality of image boundaries are placed within the display area with each image boundary overlapping or being overlapped by at least a portion of another image boundary to form an overlapping montage of images. In this case, the analysing step further comprises identifying "don't care" regions of the composition map. The "don't care" regions are regions of or regions adjacent the selected combinations of regions of interest that may optionally be excluded from the processed image. Preferably the overlapping portions of the image montage comprise the "don't care" regions. The don't care regions need not be explicitly calculated if "include" and "exclude" regions are defined since the don't care regions are what's left.

According to a second aspect of the present invention there is provided a method of arranging a plurality of images within a display area, the method comprising the steps of: analysing each of said plurality of images in accordance with at least one compositional rule to thereby identify one or more regions of each image to be excluded from said image; placing said analysed images within said display area, such that some images overlap a portion of at least one other image, whereby said overlapping portions obscure one or more of said regions to be excluded.

Preferably the regions to be excluded from images that are not themselves obscured by overlapping portions are cropped from the image. Preferably the analysing step of this second aspect of the present invention is the same as that as for the first aspect of the present invention and identifies the regions to be excluded from the images.

Preferably the analysis also identifies "don't care" regions which may be partially or wholly overlapped by another image.

Preferably the placement of the overlapping images within the display area is determined by one or more parameters of the images. Such parameters may include the composition of the image, the overall brightness of the image or the contrast between regions of interest and remaining portions of the image. These parameters may be adjustable by a user.

According to a third aspect of the present invention there is provided an image processing apparatus for arranging a number of images within a display area, comprising: an input arranged to receive said images; an image processor coupled to said input and arranged to arrange said images in accordance with the method according to the first or second aspect of the invention; and an output coupled to said image processor arranged to output said arrangement of images within the display area.

According to a fourth aspect of the present invention the image processing apparatus of the third aspect of the present invention is provided in combination with an image capture device, wherein the input of the image processing system is arranged to receive the captured images from the image capture device.

Preferably the output of the image processing system is coupled to an image storage device. The image storage device may be a separate computer, computer hard disk, or any other suitable storage medium.

Preferably the output of the image processing system is coupled to a printer, thereby allowing hard copies of the arrangement of the images to be printed out.

BRIEF DESCRIPTION OF THE DRAWINGS

According to a fifth aspect of the present invention there is provided a computer program product comprising computer readable instructions for causing a computer to execute the method of the first or second aspects of the present invention.

The present invention will now be described, by way of example, with reference to the accompanying figures, in which.

DETAILED DESCRIPTION

Figure 1:
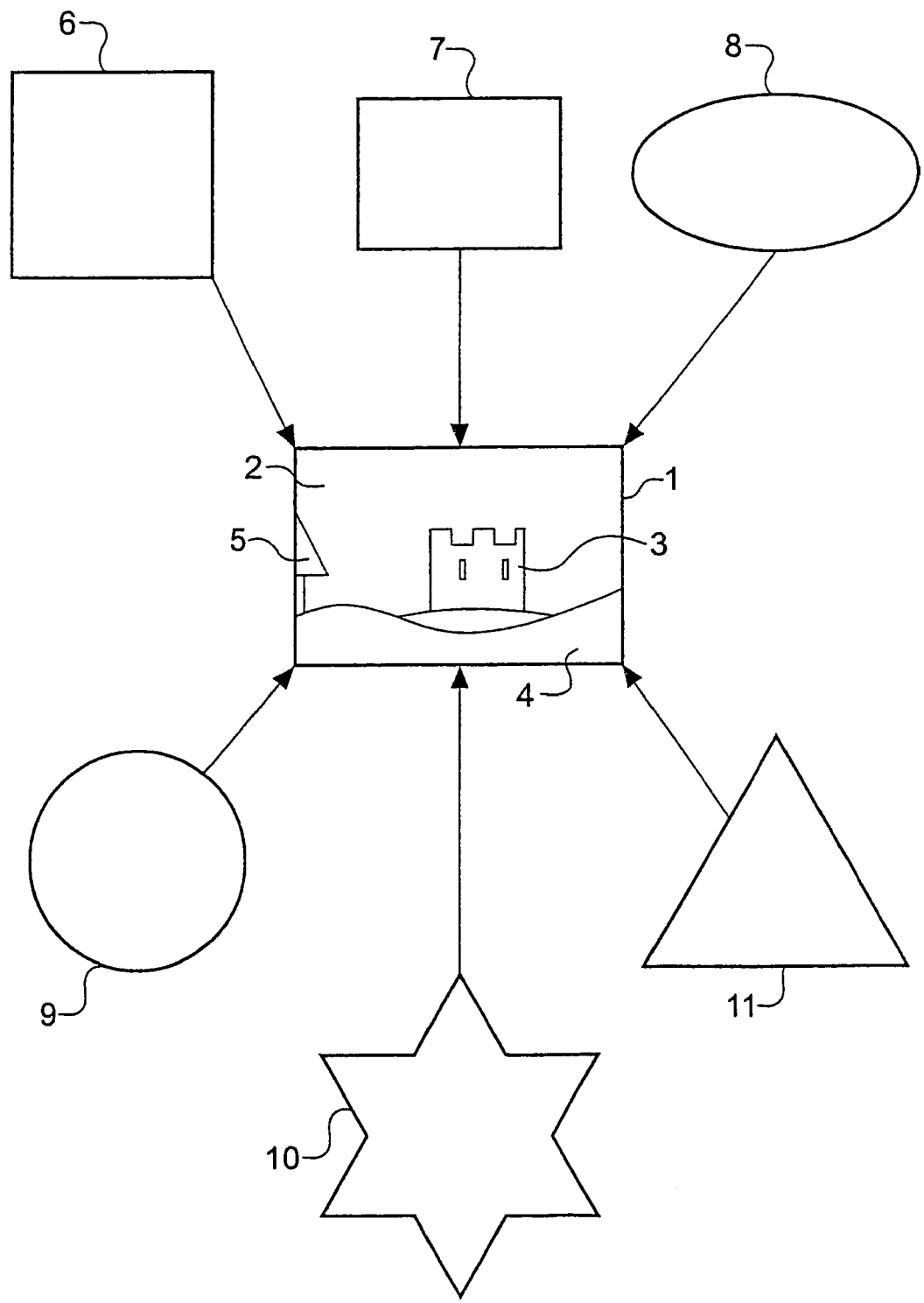
FIG. 1 schematically illustrates the application of an embodiment of the present invention to generate a greetings card.

FIG. 1 schematically illustrates the operation of an embodiment of the present invention in relation to the generation of a greeting card or the like. The user presents an image 1 that is to be the subject of the greeting card. The image may be downloaded from a camera, or selected from a user's "album" of images or selected from a pre-prepared store of images. In FIG. 1 the image 1 has four distinct areas of compositional significance, namely: the sky 2, the building 3 substantially in the centre of the image, the ground 4 and the partial tree 5 on the far left hand side of the image. The image 1 shown is a particular example where the composition of the image may be improved by removing the partial area of significance, in this case the tree 5, from the very edge of the image. An area, or feature, of compositional significance is any area or feature of the image that may be used by a compositional rule. Such features of significance may include regions of interest, horizon positions, significantly contrasting boundaries between regions of the image, areas of intense colour or brightness, areas of low intensity, brightness or contrast (i.e. probably boring areas) and "busy" regions of the image. A region of interest is an area of an image that constitutes a subject. An image may include more than one region of interest.

The image is analysed (as described hereinafter) to identify regions of interest and the areas of compositional significance and to apply one or more rules of composition to the image on the basis of the identified areas. Such a rule of composition may be the rule of thirds, where the image is sub-divided by two parallel horizontal and two parallel vertical lines in a manner of a noughts and crosses board and areas of significance that are be included are positioned on the intersections, or close to the intersections, of the horizontal and vertical lines. Another possible rule of composition would be to remove any areas of significance located at the very edge of the total image.

After performing this analysis one or more composition maps are generated for the image. Each composition map defines a combination of "include" regions of interest and "exclude" regions of significance. The "include" and "exclude" regions are determined by applying the selected rules of composition in conjunction with the features of compositional significance appropriate to the particular combination of regions of significance. It will be appreciated that a more refined allocation system having a number of different "rankings" may be applied.

A plurality of predefined, generic shapes that are provided as image boundaries 6-11 are shown. These include a square 6, a rectangle 7, an ellipse 8, an circle 9, a star 10 and a triangle 11. This list is not exhaustive and more complex, and indeed non-geometric, shapes may also provided.

A matching process is applied to each of the generic image boundaries 6 to 11 so as to determine the best fit of region of interest combination with image boundary. The best fit is the pairing of generic image boundary and the composition map that includes as many of the "include" regions of the image as possible, whilst excluding as many of the "exclude" regions as possible. That is to say, the best fit is provided by that shape of image boundary that provides an image that best conforms to the selected rules of composition. The best fit is generally, but not necessarily, the generic shape of image boundary that not only excludes the "exclude" regions and includes the "include" regions, but also minimises large boring areas of the image. The best fit may be determined by applying a set of heuristic rules to the bounded images that generate a "penalty" for the bounded image. The penalties generated by each rule may be combined as a weighted sum for the image, and the weighted sum for each image/boundary combination used to determine the best fits. One such method is described in the applicant's co-pending UK application, GB0031423.7. It will be appreciated by those skilled in the art that other known methods of image evaluation may be used instead of, or in addition to, this method. Parameters of the shape of the image boundaries, including the aspect ratio, may be varied to best accomplish this. The image boundary shape parameters will vary depending on the generic shape. For example, for the rectangle 7 the aspect ratio may be varied, yet for the star 10 the number of arms and their length relative to the star size may be varied.

The best fit of the predefined image boundaries 6 to 11 is selected as the final image boundary. The boundary is then used to crop the image so as to create a processed image. The processed image is then applied to the available display area, which in the case of a greetings card is typically the rectangular front of the card. The display area layout i.e. the arrangement of the or each processed image on the display area can also be varied. The position and size of each processed image as defined by its image boundary on the display area may be varied. If an image boundary has already been matched to a composition map for an image then adjustment of the size of the image boundary on the display area causes a corresponding scaling of the image within the image boundary.

Thus, supposing that the automatic analysis had been applied to the image 1 of FIG. 1, the compositional rules would identify the regions of compositional significance 2, 3, 4 and 5. Of these, the regions 3 and 5, that is the castle and partial tree would be identified as regions if interest, whereas regions 2 and 4, that is the sly and ground, would be identified as boring areas. The analysis then identifies the areas as follows:

| REGION | STATUS |
|--------|--------|
| 2 | Don't care |
| 3 | Include |
| 4 | Don't care |
| 5 | Exclude |

The algorithm may then seek to apply a boundary from the generic shapes, based on the image analysis and the shape of a target display area. In this case the target display area is defined by the perimeter 12 of the greeting card.

Figure 2:
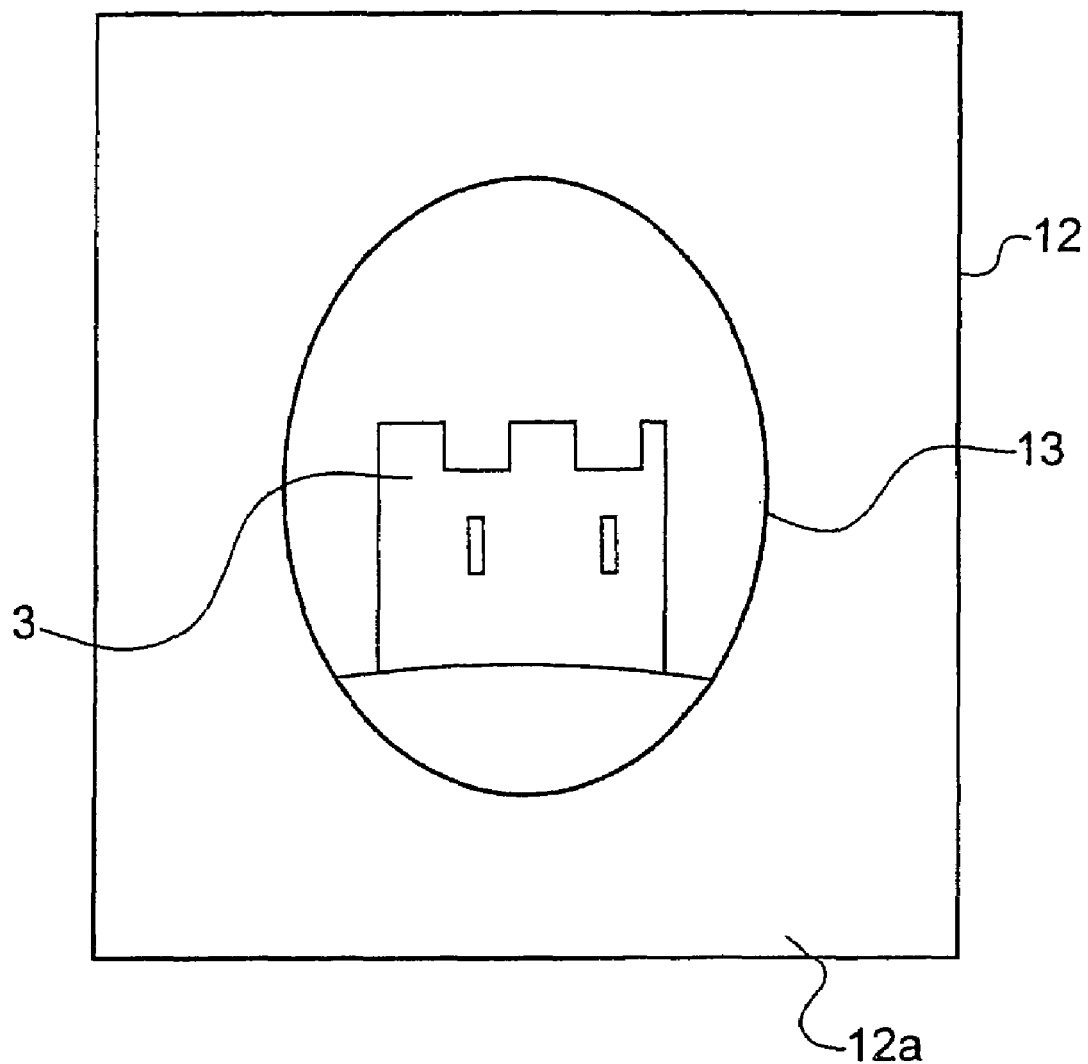
FIG. 2 schematically illustrates a finished greeting card.

The fitting process may scale or rotate the generic shapes. Thus, for example, a quarter rotation of ellipse 8 to generate an image boundary 13 framing the castle 3 and excluding the tree 5 may be presented to the user as a finished card, as shown in FIG. 2.

The colour and texture/pattern of the border 12a of the finished card may also be selected automatically, or semi-automatically. Thus the compositional rules could be used to identify the dominant or significant colours in the image. The border may then be selected so as to match, compliment or content with the image based on a knowledge of commonly accepted colour matching rules (which may vary with geographical region around the world) or with knowledge of the user's preferences. Such user preference data may be entered by the user in a set up mode, or may be deduced from previous times where a user has selected a border.

Similarly pattern or ornament of the border may be automatically selected based on an analysis of the content of the image and the use of rules concerning border selection.

Although in the embodiment of the invention just described the entire process is performed automatically, in other embodiments the user may provide some input to the process. For example, the user may select the particular generic shape of the image boundary that is to be used. In addition, or alternatively, a number of alternative pairings of image boundary shape and region of interest combination may be presented to the user for final selection.

Figure 3:
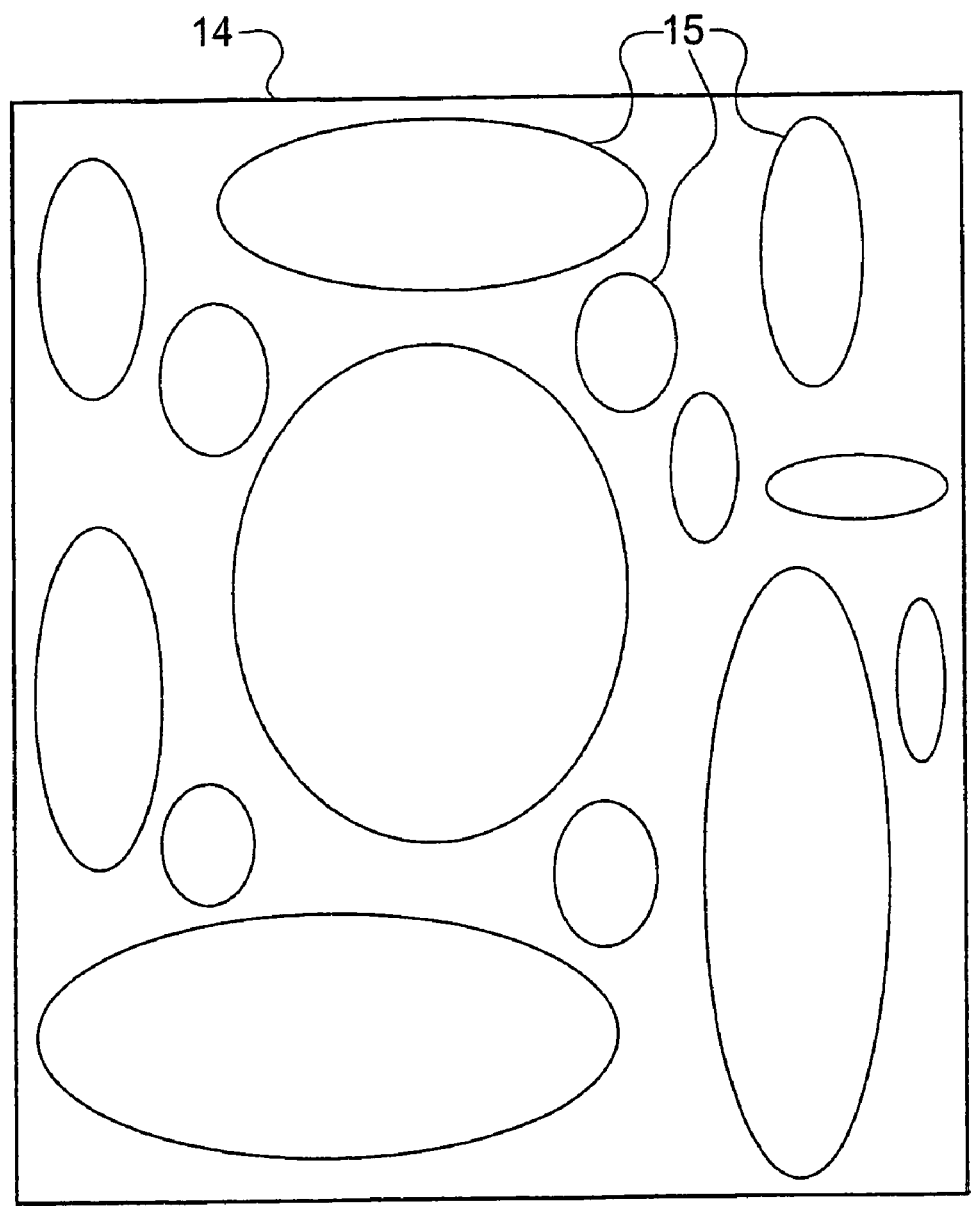
FIG. 3 schematically illustrates the application of an embodiment of the present invention to the generation of a photo-montage.
Figure 3:
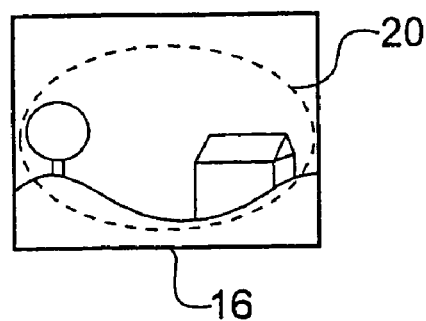
Figure 3:
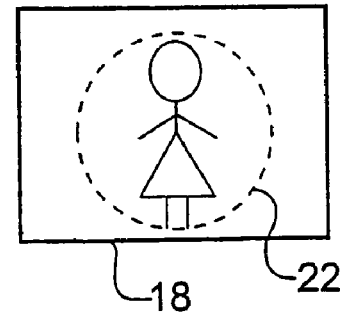

FIG. 3 shows the application of the present invention to the generation of a photo-montage. A predefined photo-montage template 14 is shown in which a number of image boundaries 15 are located. The image template 14 may be entirely predefined, or a user may be able to generate a template 14 by controlling one or more template parameters. The template may also be created automatically or semi-automatically based on a combination of the content of the source images and the user's preferences. Suitable template parameters may include the choice of one or more generic shapes for the image boundaries, the range of variation of boundary shapes to be permitted, the minimum and/or maximum number of boundaries to be used or the distance between individual boundaries. This list is not to be considered as being exhaustive. The image boundaries may, for example, be geometric shapes as shown in FIG. 3. In this example, the image boundaries are all elliptical, however other shapes, for example, rectangles may be used or mixtures of shapes may be used. Also shown are two images 16 and 18. In practice a larger number of images will be available, the number of images being substantially the same as the number of image boundaries 15 included within the photo-montage template 14. However, it is not necessary to have exactly the same number of images as there are image boundaries 15 within the template 14. Each image is analysed in the same manner as that described in relation to FIGS. 1 and 2, and each of the image boundaries 15 making up the montage template 14 is fitted to each analysed image or vice versa In this way the most appropriate image is matched with the most appropriate image boundary. For example an ellipse 20 (shown in chain line) may be the most appropriate image boundary for the first image 16. Equally, a circle 22 (shown in chain line) may be the most appropriate image boundary for the second image 18. The same image may be used more than once where the total number of images is less than the total number of image outlines 15 in the montage template. In this case, different region of interest combinations, as defined by the composition maps, may be selected such that a number of different image boundaries 15 may be fitted to a single image. For example, where an image has two discrete "include" regions of interest, two separate image boundaries may be fitted to respective regions and each processed image boundary applied to the montage. Equally, where the total number of images available exceeds the number of image boundaries available in the montage templates 14, those images having the least satisfactory fit of regions of interest combination and image boundary 15 will be discarded. The fitting of images to boundaries may be performed using a crop penalty analysis. Thus a crop penalty metric may be obtained for the best crop of each image/hole combination. Any image/hole combinations which cause "include" regions to be cropped or which leave empty space within the hole are penalised. Combinations which cause exclude regions to be included may be either automatically discarded, or maintained with a very large penalty—just in case they feature in one of the best solutions to the fitting problem. An allocation of images to holes is then found such that each hole is filled by an image and that different images are presented at different holes although if necessary images may be reused, or some may be excluded. The combination of images and hole pairs that minimises the crop penalty is the likely best solution to the montage arrangement. Thus allocation of images to holes is globally optimised for the montage.

The user may select some images as "key" images. These images may be preferentially weighted such that they constitute an increased proportion of the overall display area. In this way the "key" images will tend to be allocated to larger holes in the montage.

In addition to marking some images as key, the user may also be able to rank images by order of importance and/or to mark some areas of the image as "must include", or to define where some of the images are to be placed.

In a preferred implementation of the invention the template can automatically modify itself to ensure that the number of available images is matched (or approximately matched to within reasonable limits) to the number of holes.

The aspect ratio of the include regions and the holes in the template are also approximately matched, although as noted hereinabove the template may further be adjustable to change parameters (such as aspect ratio) of the holes defined therein.

Figure 4:
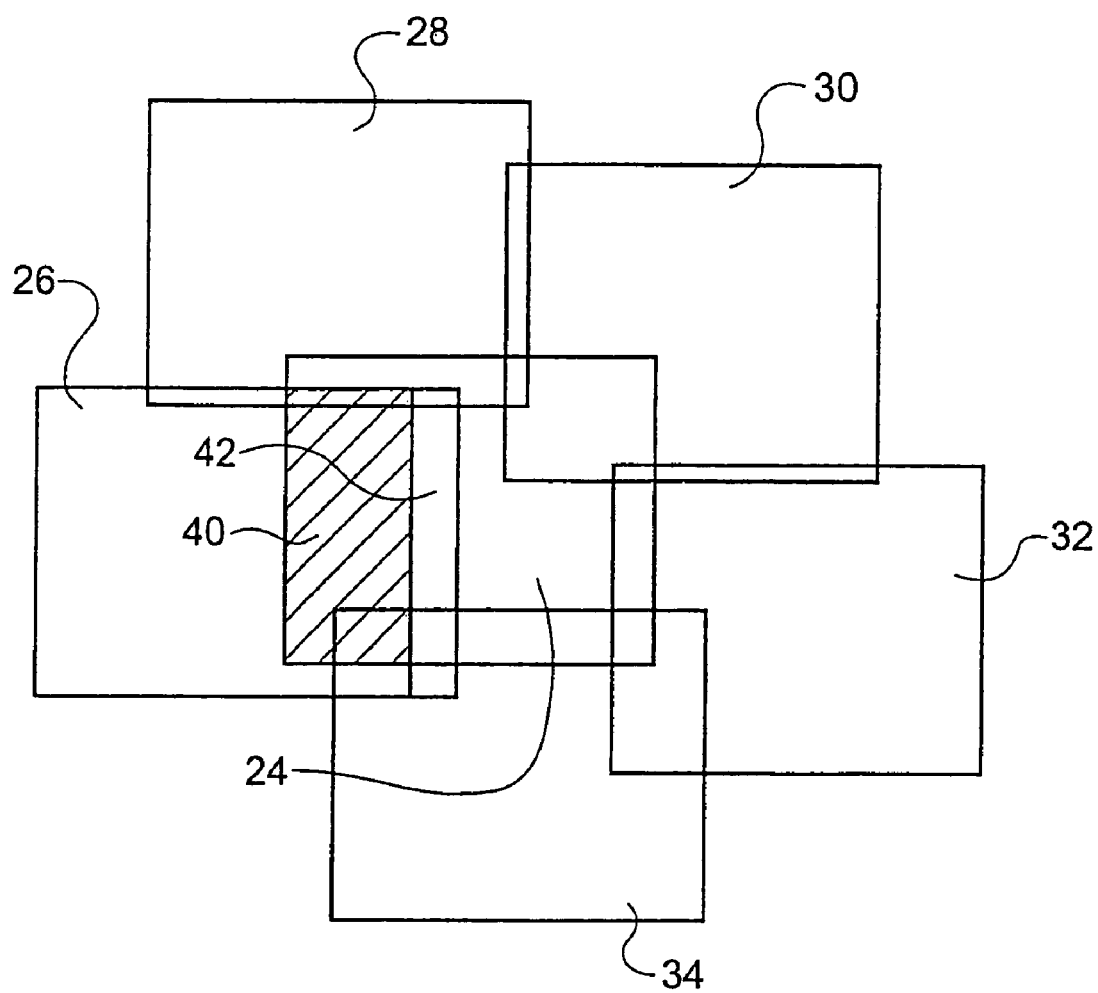
FIG. 4 schematically illustrates an embodiment of the present invention to generate a free form photo-montage.

FIG. 4 illustrates the generation of a "free form" photo-montage in accordance with an embodiment of the present invention. A "free form" photo-montage comprises a number of images overlapping each other at the edges, with (generally) no space in between the images. The amount that each image is overlapped with another image is selected to mask unwanted parts of the image from view. In this embodiment of the invention a central image 24 is first chosen, the central image being chosen on the grounds of a large, strongly contrasting subject, for example. The selection may either be manually performed by the user, or analysis of the available images may be performed by the image processor in accordance with one or more of the previously mentioned composition rules and a suitable image thus selected.

Regardless of the method of selection, the central image must be analysed as previously discussed to determine the "include" and "exclude" regions (and by implication "don't care" regions). A further image 26 is then analysed in a similar manner to define the "include" and "exclude" regions for the further image 26. The two images are subsequently overlapped in such a manner that "exclude" regions of one of the images are masked from view by a portion of the other image. Subsequent additional images 28, 30, 32 and 34 are analysed and added in a similar manner, further adding to the montage. Thus for a 'free form' photo-montage the image boundary for each individual image is defined by the edges of the overlapping images.

If the subsequently added images are to be overlaid on top of existing images, then the images to be added are preferably cropped along those regions that are to cover the existing montage so as to remove any "exclude" regions and optionally some or all of the "don't care" regions from that side. For example, consider that the subsequent image 26 is the first image to be added to the central image 24. The hatched area 40 represents that portion of the central image 24 that constitutes an "exclude" region. However, the small area 42 to the right of the subsequent image 26 is an "exclude" region of the additional image 26.

This additional area 42 must be cropped from the image 26 prior to that image being placed over the central image 24 and overlapping the hatched area 40. Thus the "exclude" region of the added image 26 has been removed by cropping, and the "exclude" area of the central image 24 has been hidden from view by overlaying the remainder of the added image 26.

The cropping has been illustrated as being rectangular, but this is not necessarily so. Cropping may occur along a curved path, for example along or adjacent the edge of an "include" object, such as a figure of person, or along a boundary of the type discussed with reference to FIGS. 1 and 2, i.e. other geometric shapes.

When all of the images have been added to the montage any remaining "exclude" regions at the edge of the montage are removed by cropping. Various additional features may be included in the generation of the montage based on the image analysis. For example, the size of the individual images comprising the montage may be gradually reduced from the centre towards the edge. A further example would be to select images for the montage that generate a gradually darkening overall tone of the montage from the centre towards the edge, or from top to bottom.

In a further embodiment of the invention, a subset of all of the available images may be selected as key images. The selection may be on the basis of the image analysis or may simply be a manual choice by the user. The most appropriate image boundary for each key image is then selected as previously described and positioned on the display area in a relatively dominant manner. Image boundaries are then subsequently defined for the smaller areas to fill the gaps between the already placed key image boundaries. The image analysis is preferably not done on a "one by one" basis but instead is a "global" fit of the available images. This approach can be used for both overlapping and non-overlapping montages.

An alternative embodiment for generating "free form" montages is also contemplated. Given a number of images, each image is analysed in the same manner as described in relation to FIGS. 1 and 2. A number of generic image boundary shapes are available, as previously described, and the best fit between each image and image boundary is generated.

In addition to identifying "include" and "exclude" regions as described previously, in this embodiment farther "don't care" regions are also identified. These are regions of the image that do not strongly conform to the heuristic rules used to identify the "include" and "exclude" regions and are regions that may optionally be included or excluded from the image boundary so as to optimise the overall fit of the image, or combination or regions of interest, to an image boundary.

The image boundaries are then placed on the display area with one or more portions of one image boundary overlapping at least one other image boundary. Those regions of an image boundary that are overlapped and are thus obscured from view may only be the remaining previously identified "don't care" regions.

The arrangement of the image boundaries may be entirely automated and determined by optimisation of the number of "don't care" regions that are obscured. Alternatively the user may control the placement of the image boundaries, although the degree of overlap may still be determined using the "don't care" regions.

In the described embodiments of the invention the image analysis requires the selection of regions of interest from each individual image.

Various schemes are known for selecting an area of interest from an electronically captured image. One such known scheme is described in the present applicants co-pending UK patent application number 0031423.7 entitled "automatic cropping of electronic images". A brief summary of the scheme disclosed in GB0031423.7 will now be described for the sake of completeness.

Figure 5:
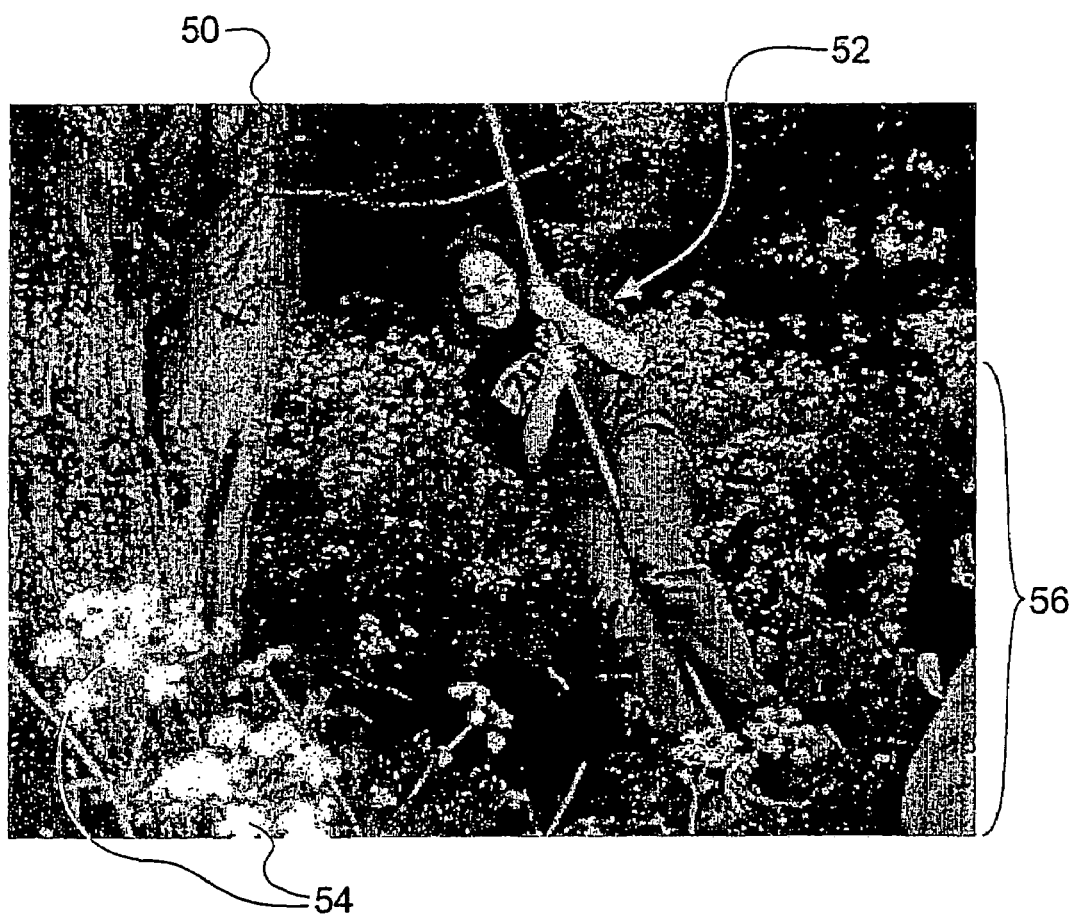
FIG. 5 shows an image to which embodiments of the present invention may be applied.

FIG. 5 shows an electronic image 50 that shows a girl 52 on a swing, in approximately the centre of the image. There is also an area to the bottom left of the image in which some flowers 54 are prominent in the foreground. Additionally, part of a small boy and an adult's arm can be seen at the right hand edge 56 of the image. It will be appreciated that although only shown using a greyscale image to aid reproduction, the original image was in colour.

Figure 6:
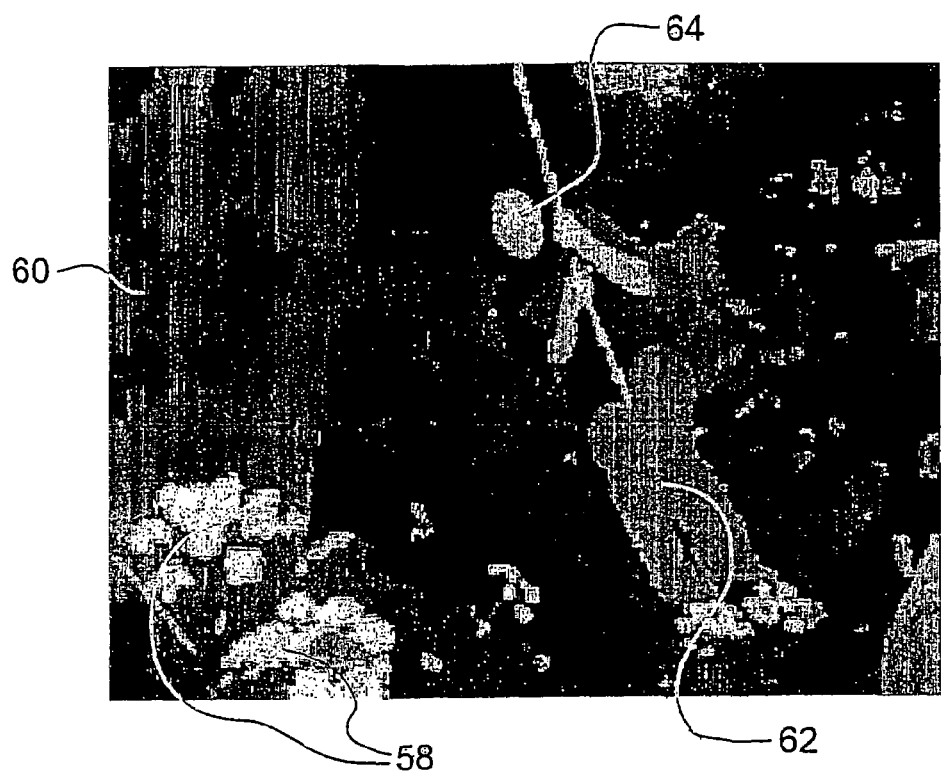
FIG. 6 shows the image of FIG. 5 having areas of averaged colour and intensity merged together.

Firstly, the image 50 is processed in such a way that areas of similar colour, intensity and texture are merged into areas having a uniform colour and intensity. This can be seen with reference to FIG. 6. The main parts of the flowers 54 have been merged to areas of uniform colour 58, as have the girl's face 64 and trousers 62. Large areas of the background have also been merged into areas of uniform colour, for example the tree 60 on the left hand side of the image. The techniques for merging the areas of similar colour are well known. For example, the image may be converted into a format having a compressed colour variation and then adjacent areas of similar colour or intensity may then be merged. Similarly, small areas surrounded by larger areas of similar colour or intensity may also be merged into the larger area.

Figure 7:
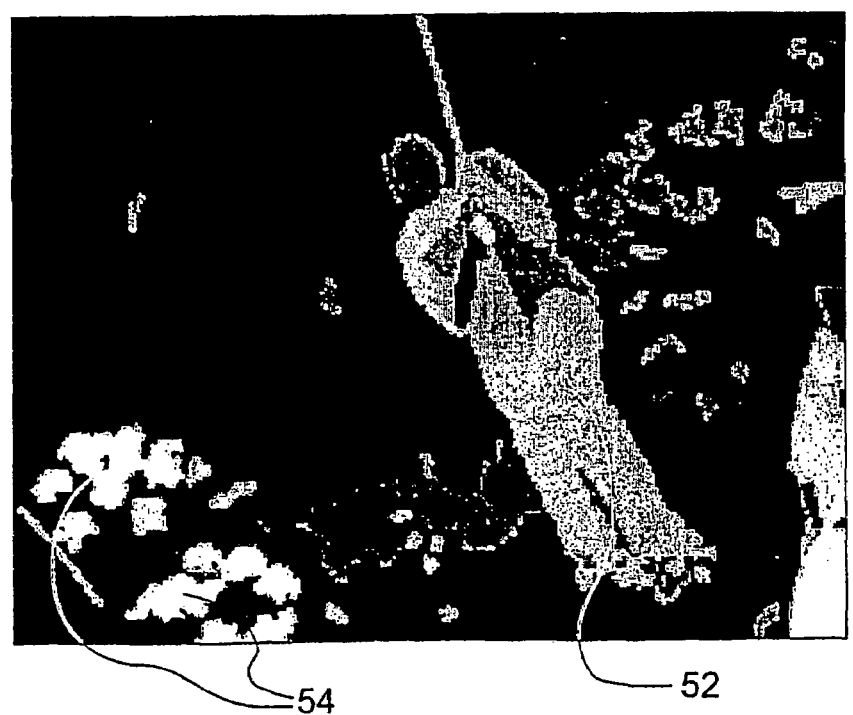
FIG. 7 shows a compositional significance map of the image shown in FIG. 5.

The resultant image is then further processed by comparing adjacent parts of the image with each other and assigning a rating to each part of the image indicative of the difference in colour and intensity between adjacent parts of the image. Using the ratings a further image, referred to as the saliency image, is generated in which the brightness of an area of the image is proportional to the difference in averaged colour and intensity of adjacent areas or is a function of the amount by which the colour differs from a colour or colours that have been judged to the background colours. The saliency image for the image picture of FIG. 5 is shown in FIG. 7. It can be seen that the girl 52 and flowers 54 are significantly brighter than other areas of the image. It should also be noted that although the girl is a single object in the real world, her face and clothing are represented by different values in the saliency image. If desirable further analysis such as face detection or proximity or similarity grouping can be applied, for example to stop single real world objects being identified as many different objects.

Having identified areas of significance within an image one or more compositional rules are applied to the saliency image to identify the "include" and "exclude" regions. For example, an area of interest located at the very edge of an image may be interpreted as a incomplete picture element and would therefore be denoted as an "exclude" region. Other known methods of selecting areas of interest from an image may equally be applied to the present invention.

Figure 8:
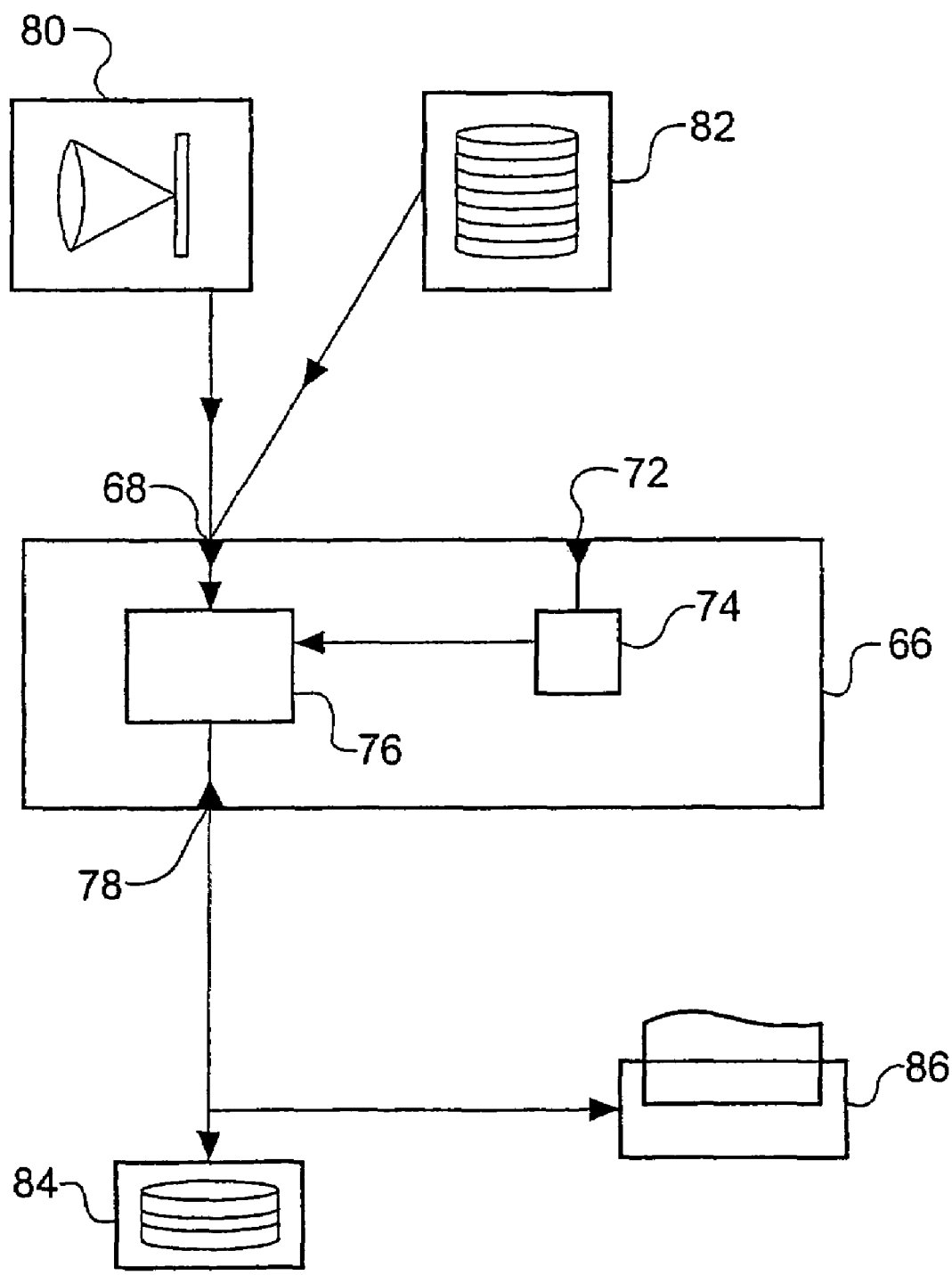
FIG. 8 schematically illustrates an image processing system constituting an embodiment of the present invention.

FIG. 8 schematically illustrates an image processing system constituting an embodiment of the present invention. The image processing system 66 has two inputs, an image input 68 arranged to receive an image 70 and an image boundary input 72. The image input 68 is connected to one or more image sources. In the embodiment shown in FIG. 8, the image input 68 is connected to an electronic camera 80 and also to a storage device 82, such as a hard disk drive or memory card, that has one or more previously captured images electronically stored. The image boundary input 72 is arranged to receive one or more of the predetermined image boundaries, together with the user defined boundaries and defined montage templates. These are stored in an image boundary memory 74. The two inputs and the image boundary memory are connected to an image processor 76 that performs the image analysis and the fitting of the image boundary or boundaries to the image 70. The results of the processing are passed to an image output 78 arranged to provide the image bounded by the appropriate image boundary. The image output 78 is connected to one or more output devices. In the embodiment shown the image output is connected to a further storage device 84 and a printing device 86. The image processing system may be integral with an image capture system in which case the framed or montage image may be directly downloaded to another device such as a printer or computer. Indeed, the image processing system may also be integral with a printer itself so that the framed or montage image may be printed immediately. The above apparatus can also be used in the generation of free form montages.

It is thus possible to provide an automated method of and apparatus for arranging an image or a plurality of images within a boarder, or a montage.

The invention claimed is:

1. A method of arranging at least one image within a display area, the method comprising the steps of:
    analysing the at least one image in accordance with at least one predefined compositional rule;
    selecting an image boundary the shape of which, in accordance with said analysis, best fits the at least one image;
    applying the image boundary to the at least one image to produce a processed image; and
    placing the processed image within said display area,
    wherein the step of analysing the image comprises identifying at least one region of compositional significance based on color and/or contrast and/or brightness differences with respect to adjacent regions in the image, and applying at least one of:
        a) at least one compositional rule to identify regions which should be included within the processed image; and
        b) at least one compositional rule to identify regions which should be excluded from the processed image,
    wherein said step of analysing the image further comprises identifying "don't care" regions of images, said "don't care" regions comprising regions that may be optionally excluded from said image boundary.

2. A method of arranging at least one image within a display area as claimed in claim 1, wherein the step of analysing the image comprises identifying one or more regions of compositional significance based on color and/or brightness differences with respect to adjacent regions in the image, and applying at least one compositional rule to identify regions which should be included within the processed image.

3. A method of arranging at least one image as claimed in claim 2, wherein the image boundary shape placed within said display area equals a number of selected combinations of regions of interest to be included, said selection being controlled by at least one heuristic rule.

4. A method as claimed in claim 2, wherein the at least one compositional rule is selected from a set comprising a plurality of rules.

5. A method as claimed in claim 4, wherein the at least one compositional rule is selected based on its relevance to one or more of the identified features.

6. A method as claimed in claim 2, wherein the step of analysing the image comprises identifying one or more regions of compositional significance which should be excluded from the processed image, the regions of computations significance being identified based on color and/or brightness differences with respect to adjacent regions in the image.

7. A method as claimed in claim 6, wherein the image boundary shape is compared with the image, and those shapes which include the regions which should be included and exclude the regions which should be excluded are presented to a user as acceptable solutions.

8. A method as claimed in claim 7, in which the image boundary shape that best includes the features to be included and best excludes the features to be excluded is presented to the user as the best fit.

9. A method of arranging at least one image within a display area as claimed in claim 1, wherein the step of analysing the image comprises identifying one or more regions of compositional significance based on color and/or brightness differences with respect to adjacent regions in the image, and applying at least one compositional rule to identify regions which should be excluded from the processed image.

10. A method as claimed in claim 9, wherein the at least one compositional rule is selected from a set comprising a plurality of compositional rules on the basis of its relevance to one or more of the identified features.

11. A method of arranging at least one image as claimed in claim 9, wherein one or more parameters of said shape of image boundary is adjusted to optimise said best fit.

12. A method of arranging at least one image as claimed in claim 9, wherein said image boundary shape is selected from a plurality of geometric shapes.

13. A method of arranging at least one image as claimed in claim 9, wherein said display area comprises a predefined arrangement of image boundaries.

14. A method of arranging at least one image as claimed in claim 9, wherein at least one of the number, position, size, shape and aspect ratio of the at least one image boundary is defined by a user.

15. A method of arranging at least one image as claimed in claim 9, wherein at least one parameter of the style of the display area is controlled by a user.

16. A method of arranging at least one image as claimed in claim 1, wherein a plurality of images are arranged and the number of image boundaries placed within said display area is equal to the number of images.

17. A method of arranging at least one image as claimed in claim 1, wherein a plurality of image boundaries are placed within said display area, at least some of the image boundaries overlapping at least a portion of one other of said image boundaries.

18. A method of arranging at least one image as claimed in claim 1, wherein said overlapping portions comprise said "don't care" regions.

19. A method of arranging at least one image as claimed in claim 1, wherein a plurality of images are arranged and the placement of the images is controlled by one or more parameters of the images.

20. A computer-readable medium storing a program product comprising computer readable instructions for causing a data processor to execute the method as claimed in claim 1.

21. A method of arranging a plurality of images within a display area, the method comprising the steps of:
analysing each of said plurality of images in accordance with at least one compositional rule to thereby identify one or more regions of each image to be excluded from said image;
placing said analysed images within said display area, such that some images overlap a portion of at least one other image, whereby said overlapping portions obscure one or more of said regions to be excluded,
wherein said step of analysing an image comprises:
identifying one or more features of compositional significance based on color and/or brightness differences with respect to adjacent regions in the image;
identifying a number of regions of interest;
selecting at least one combination of one or more of said regions of interest;
applying said at least one composition rule to those said features of compositional significance located within said selected combination of regions of interest to thereby identify "must include" and "must exclude" regions of said selected combination; and
identifying "don't care" regions of images, said "don't care" regions comprising regions that may be optionally excluded from an image boundary.

22. A method of arranging a number of images as claimed in claim 21, wherein regions to be excluded for each image that are not obscured by said overlapping portions are cropped from said image.

23. A method of arranging a plurality of images within a display area as claimed in claim 21, wherein the method further comprises identifying "don't care" regions which may be wholly or partially overlapped by another image.

24. A method of arranging a plurality of image according to claim 21, wherein placement of said images is controlled by one or more parameters of said images.

25. A computer-readable medium storing a program product comprising computer readable instructions for causing a programmable data processor to execute the method as claimed in claim 21.

26. An image processing system for arranging a number of images within a display area, comprising:
an input arranged to receive said images;
an image processor coupled to said input; and
an output coupled to said image processor, and arranged to output said arrangement of images within the display area;
wherein the image processor is arranged:
to analyse at least one image in accordance with at least one predefined compositional rule;
to select an image boundary the shape of which, in accordance with said analysis, best fits said image;
to apply the image boundary to the at least one image to produce a processed image; and
to place the processed image within said display areas,
wherein the step of analysing the image comprises identifying at least one region of compositional significance based on color and/or brightness differences with respect to adjacent regions in the image, and applying at least one of:
a) at least one compositional rule to identify regions which should be included within the processed image; and
b) at least one compositional rule to identify regions which should be excluded from the processed image,
wherein said step of analysing the image further comprises identifying "don't care" regions of images, said "don't care" regions comprising regions that may be optionally excluded from said image boundary.

* * * * *